United States Patent
Endler et al.

(10) Patent No.: US 7,480,001 B2
(45) Date of Patent: Jan. 20, 2009

(54) DIGITAL CAMERA WITH A SPHERICAL DISPLAY

(75) Inventors: Sean Christopher Endler, San Francisco, CA (US); Hiroshi Yasutomi, Tokyo (JP); Andy Proehl, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 613 days.

(21) Appl. No.: 10/821,142

(22) Filed: Apr. 7, 2004

(65) Prior Publication Data

US 2005/0001898 A1 Jan. 6, 2005

Related U.S. Application Data

(60) Provisional application No. 60/484,282, filed on Jul. 2, 2003.

(51) Int. Cl.
*H04N 5/222* (2006.01)

(52) U.S. Cl. .................................. 348/333.01

(58) Field of Classification Search ............ 348/333.01; 434/135, 136
See application file for complete search history.

(56) References Cited

U.S. PATENT DOCUMENTS

| | | | | |
|---|---|---|---|---|
| 4,276,561 A * | 6/1981 | Friedman | ...... | 358/524 |
| 4,621,915 A | 11/1986 | Klainos | | |
| 5,023,725 A * | 6/1991 | McCutchen | ...... | 348/38 |
| 5,030,100 A * | 7/1991 | Hilderman | ...... | 434/132 |
| 5,050,056 A * | 9/1991 | Ellison | ...... | 362/300 |
| 5,688,567 A * | 11/1997 | Daulton | ...... | 428/11 |
| 5,703,604 A * | 12/1997 | McCutchen | ...... | 345/8 |
| 5,898,421 A * | 4/1999 | Quinn | ...... | 345/156 |
| 5,945,985 A | 8/1999 | Babin et al. | | |
| 6,068,486 A * | 5/2000 | Frank et al. | ...... | 434/135 |
| 6,527,555 B1 * | 3/2003 | Storm | ...... | 434/131 |
| 6,622,148 B1 | 9/2003 | Noble et al. | | |
| 6,628,313 B1 | 9/2003 | Minakuchi et al. | | |
| 6,753,847 B2 | 6/2004 | Kurtenbach et al. | | |
| 7,107,516 B1 | 9/2006 | Anderson et al. | | |
| 2002/0030665 A1 | 3/2002 | Ano | | |
| 2003/0020743 A1 | 1/2003 | Barbieri | | |
| 2003/0146915 A1 | 8/2003 | Brook et al. | | |
| 2004/0001111 A1 | 1/2004 | Fitzmaurice et al. | | |
| 2004/0264579 A1 | 12/2004 | Bhatia et al. | | |
| 2005/0017924 A1 * | 1/2005 | Utt et al. | ...... | 345/32 |

OTHER PUBLICATIONS

PCT International Search Report and Written Opinion of the International Searching Authority, mailing date Nov. 21, 2006.

(Continued)

*Primary Examiner*—James M Hannett
(74) *Attorney, Agent, or Firm*—Fitch, Even, Tabin & Flannery (57) ABSTRACT

In one embodiment, the methods and apparatuses simultaneously display a first content stream and a second content stream within a spherical display; receive instructions to change a partition between a first area for displaying the first content stream and a second area for displaying the second content stream; and dynamically partition the first area and the second area based on the instructions, wherein the first area and the second area are within the spherical display.

19 Claims, 12 Drawing Sheets

OTHER PUBLICATIONS

U.S. Appl. No. 10/820,416, filed Apr. 7, 2004, Inventor: Endler.
Office Action from U.S. Appl. No. 10/820,416 dated Mar. 7, 2007 (81488).
Office Action from U.S. Appl. No. 10/820,416 dated Aug. 20, 2007 (81488).
International Preliminary Report on Patentability from PCT/US04/21250 dated Oct. 9, 2007 (81488 pct).
Office Action from U.S. Appl. No. 10/820,416 dated Mar. 14, 2008 (81488).
Advisory Action from U.S. Appl. No. 10/820,416 dated Nov. 19, 2007 (81488).
Merrian-Webster's Collegiate Dictionary, Tenth Ed., copr. 2001, p. 170.

* cited by examiner

1. Unique Identifier – 410

2. Content Type ~420

3. Content Source ~430

4. Content Listing ~440

DIGITAL CAMERA WITH A SPHERICAL DISPLAY

CROSS REFERENCE TO RELATED APPLICATIONS

The present application claims benefit of U.S. Provisional Patent Application No. 60/484,282 filed on Jul. 2, 2003, entitled "Gear-on" listing the same inventors, the disclosure of which is hereby incorporated by reference.

FIELD OF THE INVENTION

The present invention relates generally to capturing content and, more particularly, to capturing and viewing content through a multi-lens device.

BACKGROUND

There are many personal video cameras in use. With the increase in quality of personal video cameras and decrease in cost and size of these cameras, it is getting easier and cheaper for individuals to capture high quality video footage of events detailing their lives. For example, many users capture traditional events such as vacations, birthdays, and weddings with their video cameras. With the increase in portability of modern personal video cameras, users are also capturing video footage of their hobbies that reflect their active lifestyles such as skiing, mountain climbing, mountain biking, kayaking, sky-diving, and the like.

With the increase in use of personal video cameras, there is an increasing amount of video footage recorded by users. Although potentially more video footage is captured, the amount of time and desire dedicated to spend viewing the captured video footage does not necessarily increase. Accordingly, there is an increasing demand to improve the quality of the captured video footage.

SUMMARY

In one embodiment, the methods and apparatuses simultaneously display a first content stream and a second content stream within a spherical display; receive instructions to change a partition between a first area for displaying the first content stream and a second area for displaying the second content stream; and dynamically partition the first area and the second area based on the instructions, wherein the first area and the second area are within the spherical display.

BRIEF DESCRIPTION OF THE DRAWINGS

The accompanying drawings, which are incorporated in and constitute a part of this specification, illustrate and explain one embodiment of the methods and apparatuses for capturing and viewing content through a multi-lens device. In the drawings.

DETAILED DESCRIPTION

The following detailed description of the methods and apparatuses for capturing and viewing content through a multi-lens device refers to the accompanying drawings. The detailed description is not intended to limit the methods and apparatuses for capturing and viewing content through a multi-lens device. Instead, the scope of the methods and apparatuses for capturing and viewing content through a multi-lens device are defined by the appended claims and equivalents. Those skilled in the art will recognize that many other implementations are possible, consistent with the present invention.

References to "content" includes textual data, graphical data, video footage, digital images, audio data, and the like.

In one embodiment, the methods and apparatuses for capturing and viewing content through a multi-lens device allow content to be captured simultaneously through multiple lenses, simultaneously display multiple content feeds to a viewer, manage multiple feeds of content through a unified interface.

Figure 1:
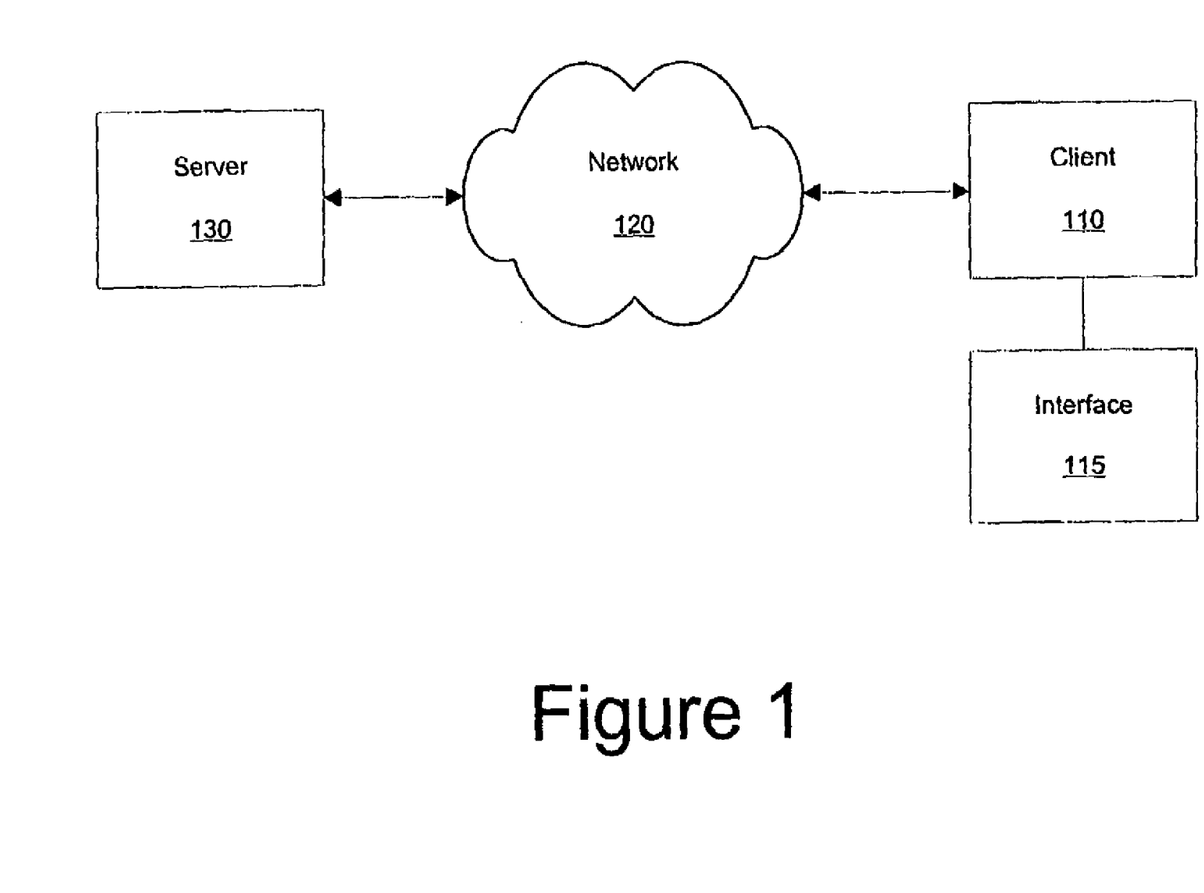
FIG. 1 is a diagram illustrating an environment within which the methods and apparatuses for capturing and viewing content through a multi-lens device are implemented.

FIG. 1 is a diagram illustrating an environment within which the methods and apparatuses for capturing and viewing content through a multi-lens device are implemented. The environment includes an electronic device 110 (e.g., a digital camera, a video camera, a display device, and a projector for displaying content), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces such as a display and speakers in the same housing. In one embodiment, the user utilizes interface 115 to access and control content and applications stored in electronic device 110, server 130, or a remote storage device (not shown) coupled via network 120.

In accordance with the invention, embodiments of capturing and viewing content through a multi-lens device below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

In one embodiment, the electronic device 110 is a content capturing device such as a digital camera, a video camera, and an audio recorder. The content capturing device is utilized to capture content. In another embodiment, the electronic device 110 is a display device such as a screen, a monitor, a projector, and the like. The display device is utilized to display the content to at least one viewer.

Figure 2:
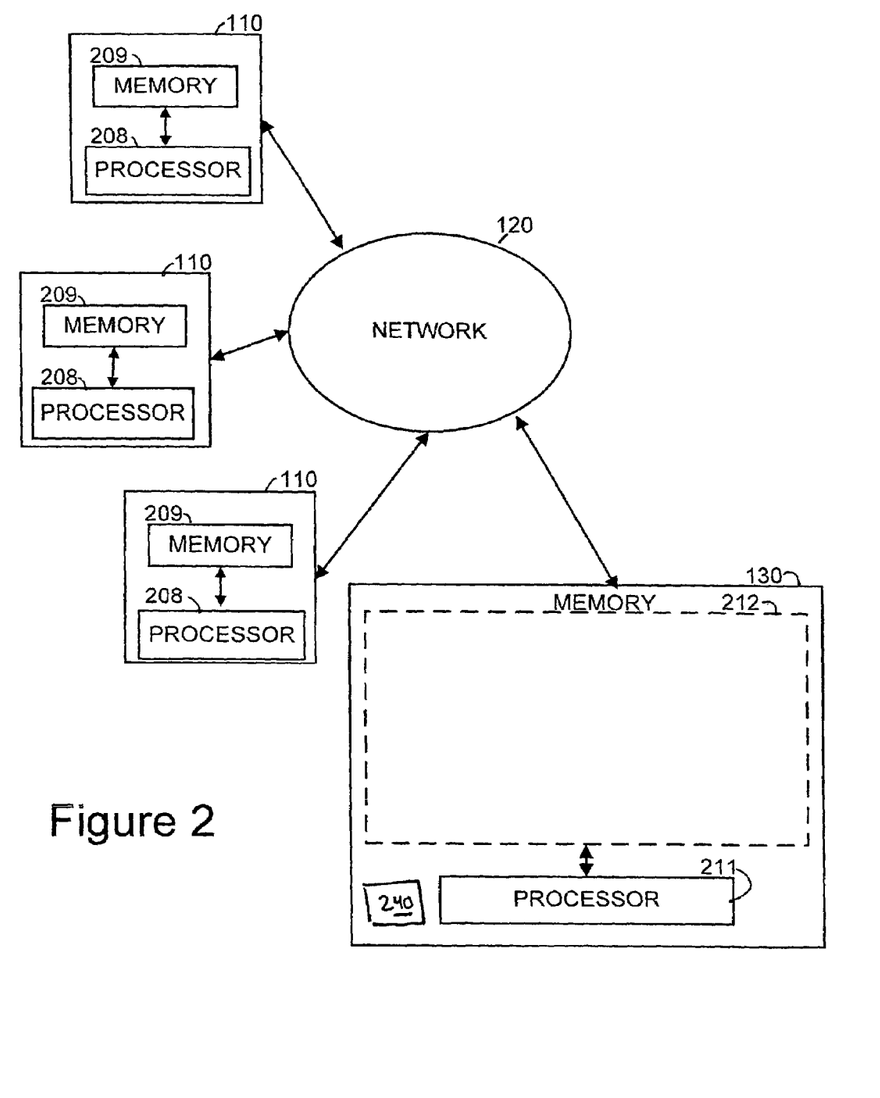
FIG. 2 is a simplified block diagram illustrating one embodiment in which the methods and apparatuses for capturing and viewing content through a multi-lens device are implemented.

FIG. 2 is a simplified diagram illustrating an exemplary architecture in which the methods and apparatuses for capturing and viewing content through a multi-lens device are implemented.

The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. In one embodiment, a unique user operates each electronic device 110 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one embodiment, the plurality of client devices 110 and the server 130 include instructions for a customized application for capturing and viewing content through a multi-lens device. In one embodiment, the plurality of computer-readable media 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on capturing and viewing content through a multi-lens device as determined using embodiments described below.

Figure 3:
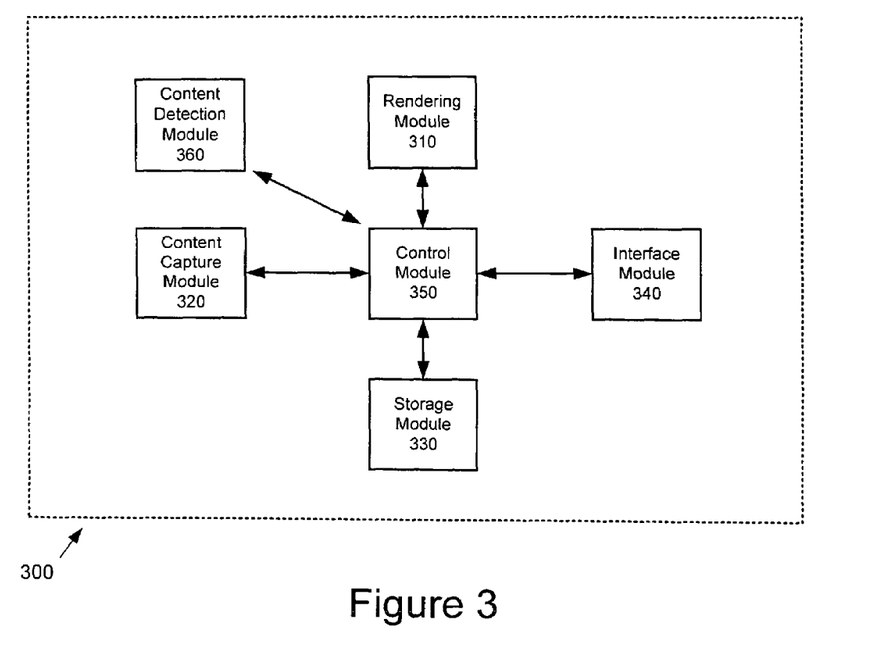
FIG. 3 is a simplified block diagram illustrating a system, consistent with one embodiment of the methods and apparatuses for capturing and viewing content through a multi-lens device.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a rendering module 310, a content capture module 320, a storage module 330, an interface module 340, a control module 350, and a content detection module 360.

In one embodiment, the control module 350 communicates with the rendering module 310, the content capture module 320, the storage module 330, the interface module 340, and the content detection module 360. In one embodiment, the control module 350 coordinates tasks, requests, and communications between the rendering module 310, the content capture module 320, the storage module 330, the interface module 340, and the content detection module 360.

In one embodiment, the rendering module 310 produces signals that present content to a viewer. In one embodiment, the signals represent content such as audio data, image data, and a combination of audio/video data.

In one embodiment, the content capture module 320 identifies the content that is being captured. In one embodiment, the content capture module 320 organizes content that is captured simultaneously through multiple lenses. For example, a video camera having multiple lenses is capable of capturing multiple unique scenes simultaneously. The content capture module 320 manages capturing those multiple unique scenes. Further, the content capture module 320 also coordinates the display of the content.

In one embodiment, the storage module 330 stores the content organized by the content capture module 320.

Figure 4:
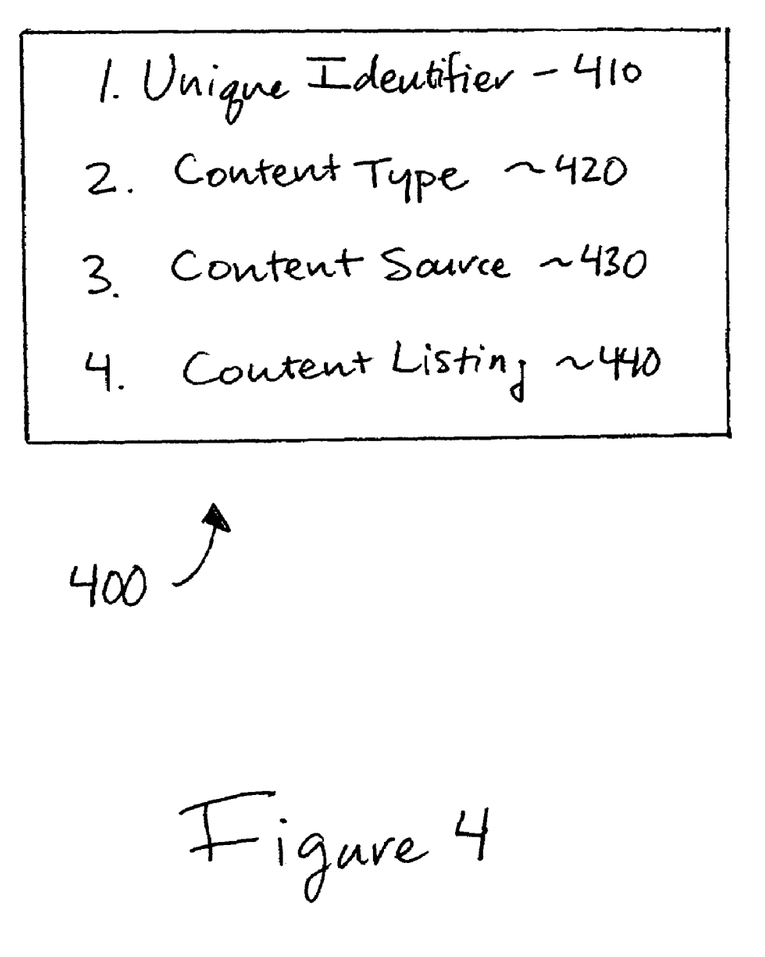
FIG. 4 is an exemplary record consistent with one embodiment of the methods and apparatuses for capturing and viewing content through a multi-lens device.

In another embodiment, the storage module 330 stores a record including information associated with a particular piece of content. An exemplary embodiment of the information contained within the record associated with the content is illustrated in FIG. 4.

In one embodiment, the interface module 340 receives a signal from one of the electronic devices 110 transmitting the content to the system 300. In this embodiment, the electronic device 110 is either a content capturing device or a content storage device.

In another embodiment, the interface module 340 transmits rendering information from the rendering module 310 to present the content to a viewer.

In yet another embodiment, the interface module 340 transmits rendering information from the rendering module 310 to an external display device such as a projector, a separate display screen, and the like. The external display is configured to be seen by the viewer.

In one embodiment, the content detection module 360 monitors the capture of the content. In one embodiment, the content includes multiple images captured simultaneously. For example, the content detection module 360 records the location of each source device. In one embodiment, the location of the source device is attached to the corresponding piece of content as metadata and is shown as a profile information in FIG. 4.

The system 300 in FIG. 3 is shown for exemplary purposes and is merely one embodiment of the methods and apparatuses for capturing and viewing content through a multi-lens device. Additional modules may be added to the system 400 without departing from the scope of the methods and apparatuses for capturing and viewing content through a multi-lens device. Similarly, modules may be combined or deleted without departing from the scope of the methods and apparatuses for capturing and viewing content through a multi-lens device.

FIG. 4 illustrates an exemplary record 400 identifying profile information corresponding to a particular piece of content for use with the methods and apparatuses for capturing and viewing content through a multi-lens device. In one embodiment, there are multiple records such that each record 400 is associated with a particular piece of content. In one embodiment, the record 400 is stored as metadata for the corresponding content. In one embodiment, the record 400 includes a unique identifier field 410, a content type field 420, a content source field 430, and a content listing field 440.

In one embodiment, the unique identifier field 410 uniquely identifies the content. In one example, a descriptive name is utilized to identify the content such as Uncle Bob's $50^{th}$ Birthday.

In one embodiment, the content type field 420 identifies the type of content associated with the particular content. For example, exemplary content types include video, audio, image, and the like.

In one embodiment, the content source field 430 identifies the origin of the content. In one embodiment, the origin of the content refers to the particular capture device that captured the content. In another embodiment, the origin of the content also refers to the specific lens that captured the content when there are multiple lenses on the same capture device. For example, both the video camera and the particular lens that captured the content is identified in the content source field 430.

In one embodiment, the content listing field 440 identifies related content. For example, if the same capture device captures different video footage through different lenses, then the content listing field 440 references these related video footage.

Figure 5:
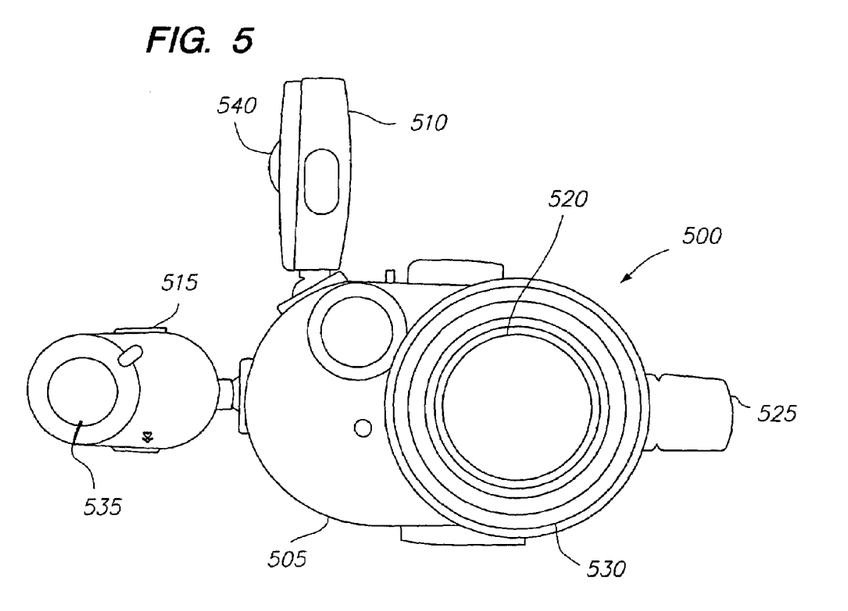
FIG. 5 is a diagram illustrating an exemplary embodiment within which the methods and apparatuses for capturing and viewing content through a multi-lens device are implemented.

FIG. 5 illustrates one embodiment of a camera 500 for capturing and displaying content through a multi-lens system. The camera 500 includes a main housing 505, a first capture module 510, and a second capture module 515. In one embodiment, the camera 500 is represented as the electronic device 110.

In one embodiment, the main housing 505 includes a spherical display 520, a control knob 525, and a playback ring 530. In one embodiment, the spherical display 520 is configured to simultaneously display video/image content and functional menu driven content. In another embodiment, the spherical display 520 is configured to simultaneously display multiple video feeds.

In one embodiment, the control knob 525 adjusts and controls the content and menu of the spherical display 520 in a vertical direction based on the direction that the knob 525 is turned.

In one embodiment, the playback ring 530 rotates in both directions. In one embodiment, the playback ring 530 is utilized to control the direction (e.g. backwards, forward) and the speed of playing back the content such as video footage based on the rotation of the playback ring 530. In another embodiment, the playback ring 530 adjusts and controls the display of the content and menu on the spherical display 520 by rotating the objects in the display 520 corresponding to a direction of the playback ring 530.

In one embodiment, the first capture module 510 includes a lens module 540 that is configured to capture visual content such as still images and video footage. In one embodiment, the first capture module 510 is removably coupled to the main housing 505. The first capture module 510 communicates with the main housing 505 via a wireless connection or a direct connection. In another embodiment, the first capture module 510 is permanently connected to the main housing 505.

In one embodiment, the second capture module 515 includes a lens module 535 that is configured to capture visual content such as still images and video footage. In one embodiment, the second capture module 515 is removably coupled to the main housing 505. In another embodiment, the second capture module 515 is permanently connected to the main housing 505.

The second capture module 515 communicates with the main housing 505 via a wireless connection or a direct connection. In one embodiment, the first and second capture modules 510 and 515 stream the visual content to the main housing 505 in real time via a wireless connection regardless of whether the capture modules 510 and 515 are physically connected with the main housing 505. In another embodiment, the capture module 510 and 515 store the captured content and transmit the captured content to the main housing 505 in segments.

In one embodiment, the capture modules 510 and 515 capture content at the same time. However, the captured content performed by the capture modules 510 and 515 are not the same and reflect a different view point or perspective of the corresponding capture module.

The capture modules 510 and 515 are shown for illustrative purposes and any number of capture modules may be utilized with the main housing 505.

In one embodiment, the capture modules 510 and 515 and the spherical display 520 enable a recording environment without a horizon. When capturing images of underwater sports, mid-air stunts, skydiving jumps, and the like, maintaining a proper orientation is difficult.

In one embodiment, the capture modules 510 and 515 further include a sensor to detect the gravitation force such that the capture modules 510 and 515 detects the direction towards the ground regardless of the orientation of the capture modules 510 and 515. In one embodiment, the sensor is a gyroscope. In another embodiment, the sensor is a mercury switch.

In one embodiment, the spherical display 520 maintains a perpendicular orientation to the gravitation force such that the images captured by the capture modules 510 and 515 and displayed on the spherical display 520 maintain the proper orientation even if the horizon is not part of the captured images. For example, the capture modules 510 and 515 continue to capture images and follow the subject regardless of the orientation of the capture modules 510 and 515 with respect to the horizon.

Figure 6A:
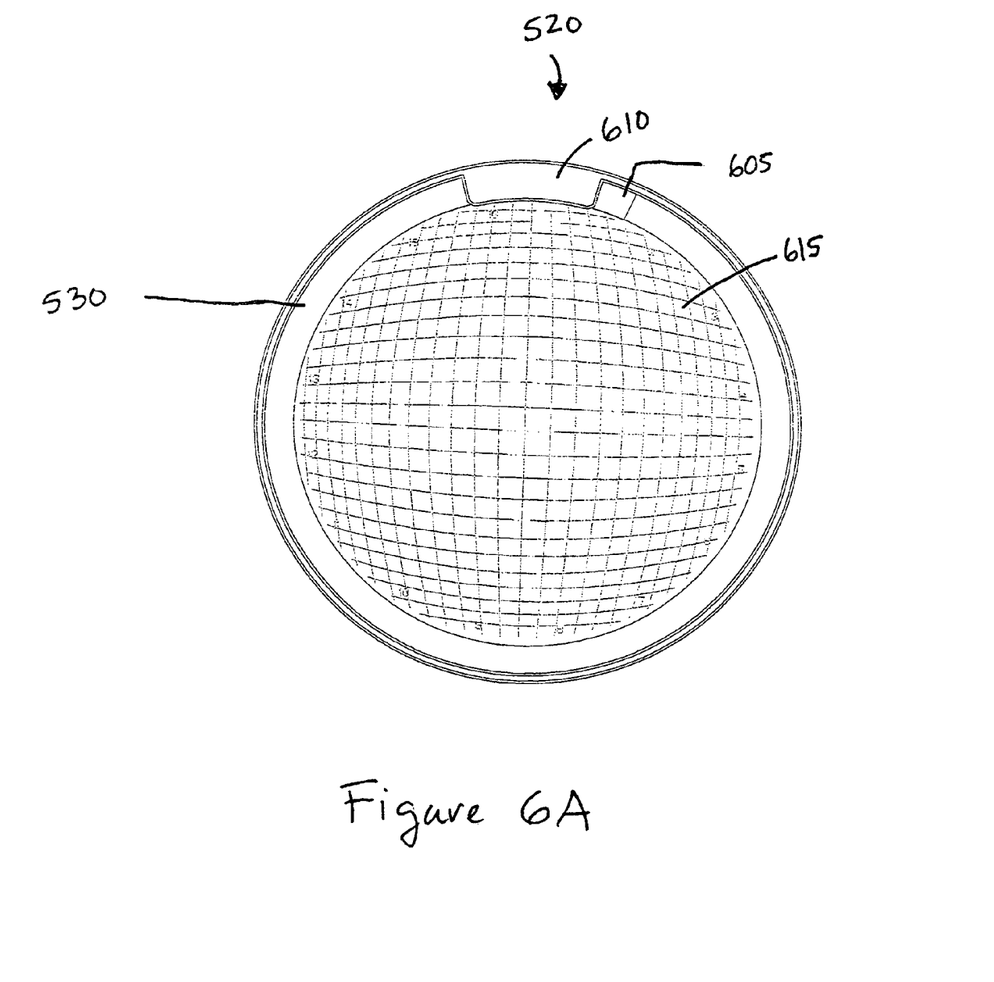
FIGS. 6A and 6B are diagrams illustrating an environment within which the methods and apparatuses for capturing and viewing content through a multi-lens device are implemented.

FIG. 6A illustrates a front view of the spherical display 520 in greater detail. The spherical display 520 includes a playback ring 530, a playback head 605, a current function display 610, and a display area 615.

In one embodiment, the playback head 605 shows a graphical reference point of the current content that is being displayed on the spherical display 520. For example, instead of using a traditional time counter to track the current playback location of the content, the location of the playback head 605 illustrates the current playback location of the content, which portion of the content has already been viewed, and the portion of content that will be viewed. In one embodiment, as the content is played, the playback head 605 moves in a clockwise direction.

In one embodiment, the current function display 610 illustrates the current function of the spherical display 520. In one embodiment, the current function includes playback of content, capture of content, and the like.

In one embodiment, the display area 615 displays the content and menu information to a viewer. The menu information allows the viewer to select particular content and select specific functions such as playback content and capture content. In one embodiment, the display area 615 is curved to display the content in a three dimensional manner. Further, the display area 615 also displays the menu information. In yet another embodiment, the content and the menu information are simultaneously displayed on the display area 615.

Figure 6B:
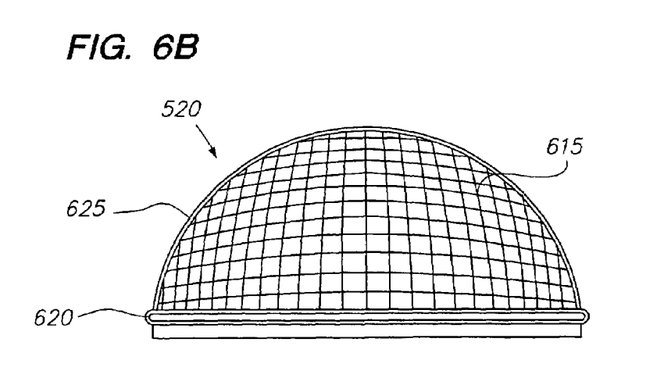

FIG. 6B illustrates a side view of the spherical display 520 in greater detail. The spherical display 520 includes a display area 615. The display area 615 includes a spherical display surface 625 and a flat display surface 620. In one embodiment, the spherical display surface 625 is a three dimensional display surface and is utilized to display either the content or the menu information. In one embodiment, the flat display surface 620 is a two dimensional display surface and is utilized to display either the content or the menu information.

In one embodiment, the content is displayed on the spherical display surface 625, and the menu information is displayed on the flat display surface 620. In another embodiment, the menu information is displayed on the spherical display surface 625, and the content is displayed on the flat display surface 620. By displaying the menu information and the content on different display surfaces (e.g. the spherical display surface 625 and the flat display surface 620), the menu information and the content are displayed simultaneously and legibly to the viewer. By displaying the menu information and the content simultaneously, there is no need to choose between exclusively viewing the content and the menu information.

Figure 7A:
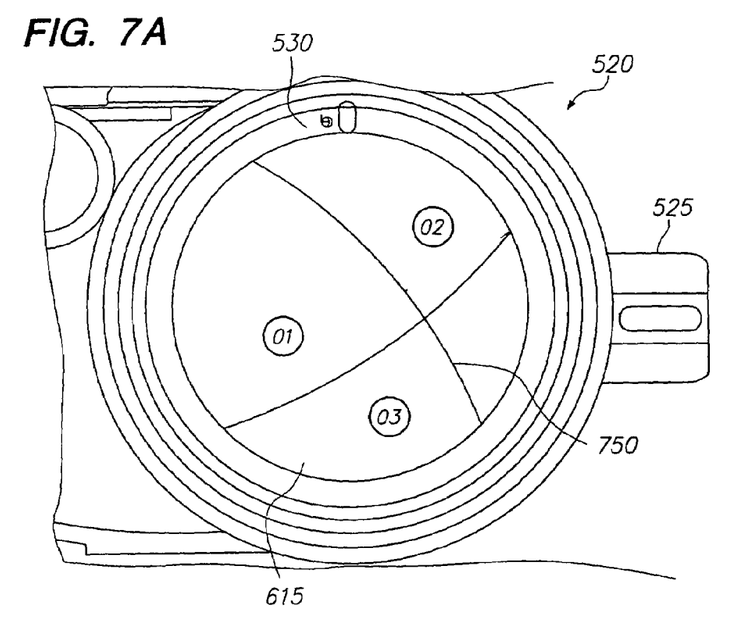
FIGS. 7A, 7B, 7C and 7D are exemplary screen shots consistent with one embodiment of the methods and apparatuses for capturing and viewing content through a multi-lens device.

FIG. 7A illustrates the spherical display 520 in the context of content shown within the display area 615. The display area 615 is shown with content 01, content 02, and content 03. Each of the content 01, 02, and 03 represent a different video footage from a particular lens. In one embodiment, the content 01, 02, and 03 are recorded at the same time from different lenses. In another embodiment, the content 01, 02, and 03 originate from the same lens and are captured at different times.

In one embodiment, a dividing demarcation 750 is shown dividing the content 01, 02, and 03. In one embodiment, the playback ring 530 in combination with the knob 525 controls the allocation of the display area 615 between the content 01, 02, and 03. For example, by rotating the knob 525, the overall orientation of the content 01, 02, and 03 is rotated. In this example, by rotating the playback ring 530, the amount of space allocated for the content 01, 02, and 03 is changed. In another example, by rotating the playback ring 530, the overall orientation of the content 01, 02, and 03 is rotated. In this example, by rotating the knob 525, the amount of space allocated for the content 01, 02, and 03 is changed.

In another embodiment, instead of the areas of the content 01, 02, and 03 representing different content, each of the areas of the content 01, 02, and 03 represent different special effects that are applied to different portions of the underlying content. The underlying content occupies the entire display area 615. Special effects include sepia tone, black and white tone, slow shutter effect, and the like. These special effects can be rendered in real-time. For example, the black and white tone is applied only to the content 01 and content 02 and 03 are left unaffected. In yet another embodiment, multiple layers of special effects are applied to the underlying content.

Figure 7B:
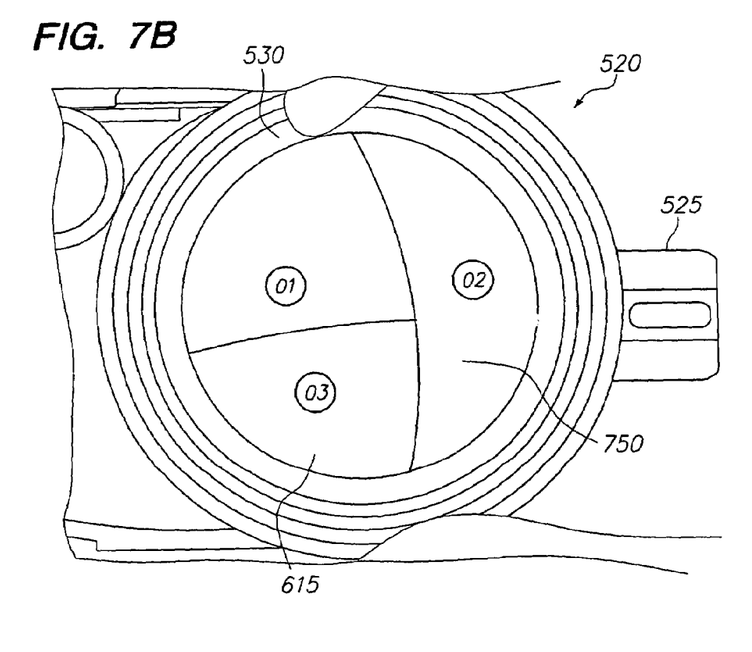

FIG. 7B illustrates the spherical display 520 in the context of content shown within the display area 615. The display area 615 is shown with content 01, content 02, and content 03. The allocation of the display area 615 for the content 01, content 02, and content 03 are changed from the content 01, content 02, and content 03 shown in FIG. 7A. In FIG. 7B, a greater area of the display area 615 is allocated for the content 01, and content 03 compared to FIG. 7A.

Figure 7C:
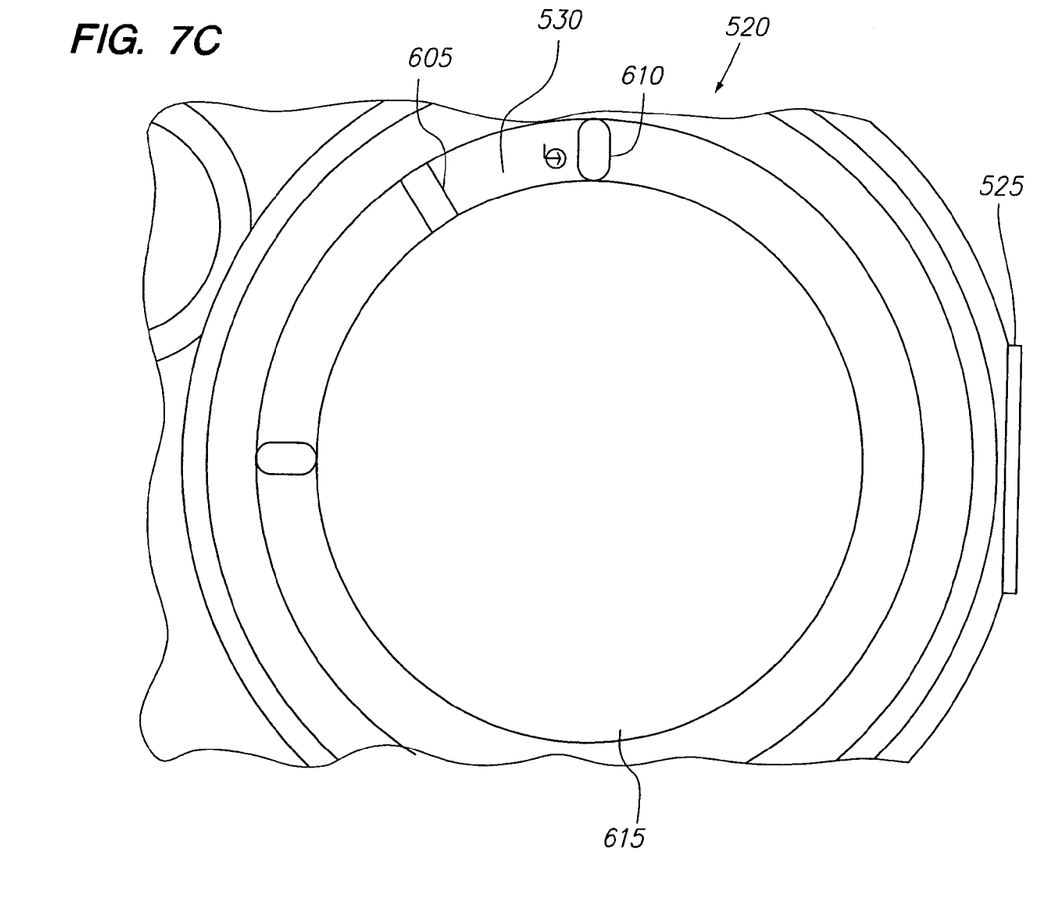

FIG. 7C illustrates the spherical display 520 in the context of content shown within the display area 615. The spherical display 520 includes the knob 525, the playback ring 530, the playback head 605, and the current display function 610. In this example, the display area 615 is displaying a single content. In one embodiment, the content within the display area 615 is shown on the flat display surface 620. Further, the current display function 610 shows that the content displayed on the display area 615 is from "storage".

Figure 7D:
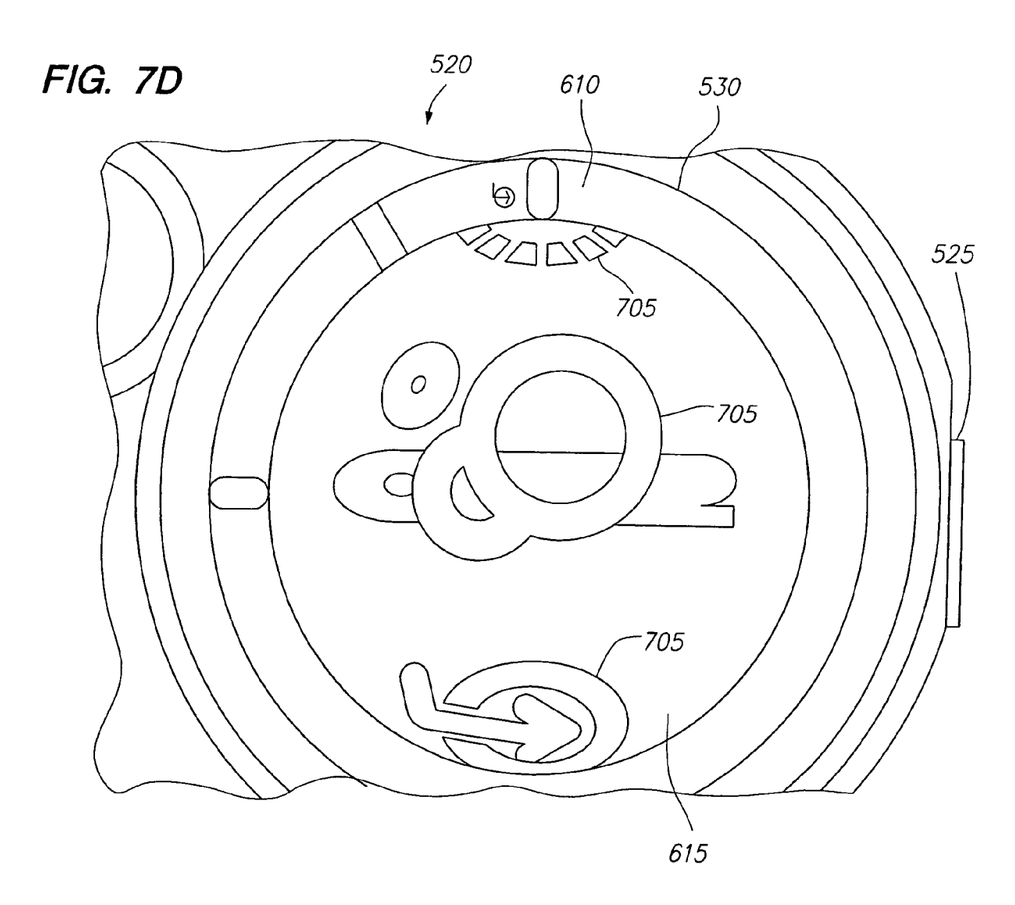

FIG. 7D illustrates the spherical display 520 in the context of content shown within the display area 615. The spherical display 520 includes the knob 525, the playback ring 530, and the current display function 610. In this example, the display area 615 is displaying a multiple menu items 705. In one embodiment, the multiple menu items 705 within the display area 615 are shown on the spherical display surface 625. In another embodiment, content such as video footage is displayed simultaneously with the menu items 705. The content is displayed on the flat display surface 620 to differentiate the menu items 705 from the content.

Further, the current display function 610 shows that the menu items 705 on the display area 615 are from "menu". In this embodiment, the knob 525 is utilized to scroll through the menu items 705.

Figure 8A:
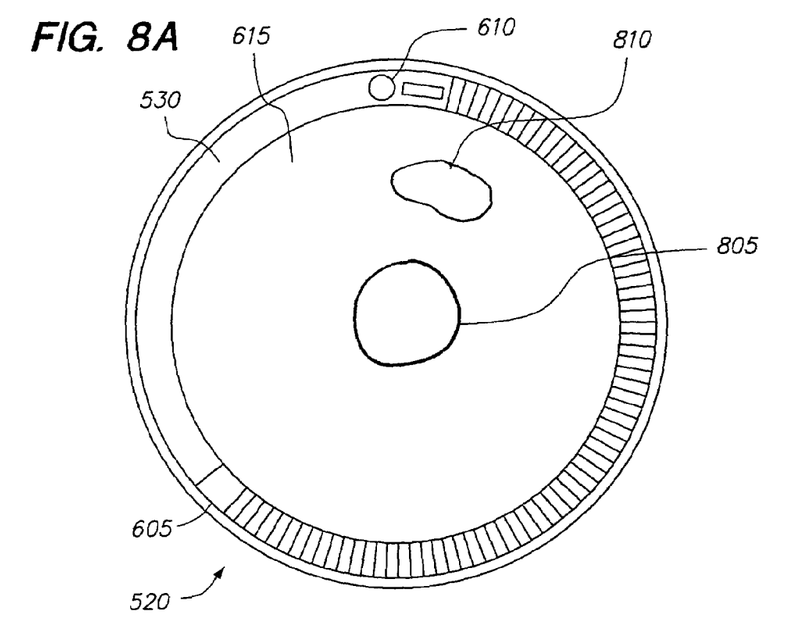
FIG. 8A, 8B, 8C are exemplary screen shots consistent with one embodiment of the methods and apparatuses for capturing and viewing content through a multi-lens device.

FIG. 8A illustrates the spherical display 520 in the context of content shown within the display area 615. The spherical display 520 includes the playback ring 530, the playback head 605, and the current display function 610. In one embodiment, the display area 615 allows a subject 810 within the display area 615 to be enlarged. The current display function 610 is shown in the "focus" mode.

In one embodiment, the display area 615 includes a focus ring 805 and the subject 810. In one embodiment, the focus ring 805 is movable within the display area 615 and displays content within an area of the focus ring 805 that is to be enlarged. For example, if it is desired to enlarge the subject 810 that is shown within the display area 615, the focus ring 805 is moved such that the focus ring 805 encompasses the subject 810. In one embodiment, the playback ring 530 is utilized to move the focus ring 805.

In another embodiment, the cursor keys 830 are utilized to position the focus ring 805 within the display area 615. The focus ring 805 is utilized to enlarge or shrink the focus ring 805 depending on the direction that the focus ring 805 is rotated.

Figure 8B:
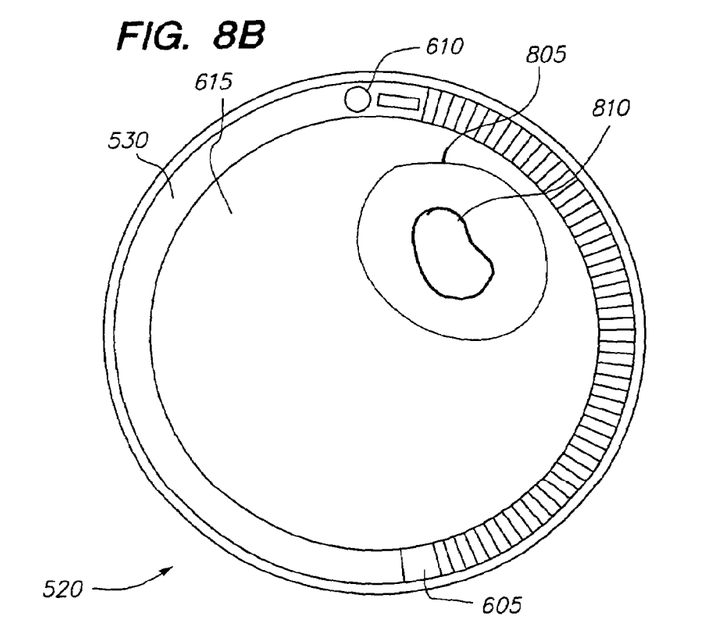

FIG. 8B illustrates the spherical display 520 in the context of content shown within the display area 615. The focus ring 805 is shown encompassing the subject 810 within the display area 615.

Figure 8C:
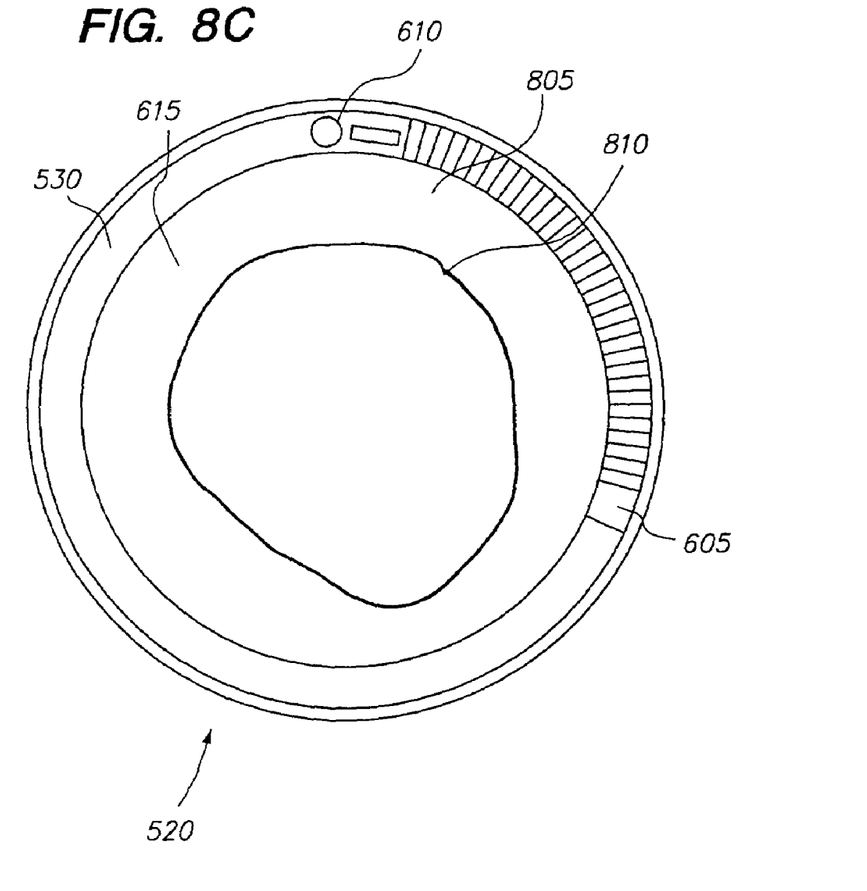

FIG. 8C illustrates the spherical display 520 in the context of content shown within the display area 615. The subject 810 is shown enlarged within the display area 615 relative to the subject 810 in FIGS. 8A and 8B. The focus ring 805 is shown encompassing the subject 810 within the display area 615.

In one embodiment, the enlargement process is accomplished by capturing a much wider perspective with a wide angle lens such as a fish eye lens as shown in FIG. 8A. When an enlargement is desired, the area within the focus ring 805 is enlarged, and the content of the surrounding areas outside the focus ring 805 are ignored. However, the content of the surrounding areas outside the focus ring 805 are continually captured even if they are not shown within the display area 615 of FIG. 8C. For example, regardless of the enlargement that is requested via the focus ring 805, the entire wide angle perspective as shown in FIG. 8A is still being captured.

FIGS. 8A, 8B, and 8C utilize the display head 605 to visually display the which portion of the content is being displayed within the display area 615. In one embodiment, the video segment (content) advances forward as the display head 605 rotates counter-clockwise. For example, the content within the display area 615 in FIG. 8A is shown prior to the content within the display area 615 in FIG. 8B. Further, the content within the display area 615 in FIG. 8B is shown prior to the content within the display area 615 in FIG. 8C.

Figure 9:
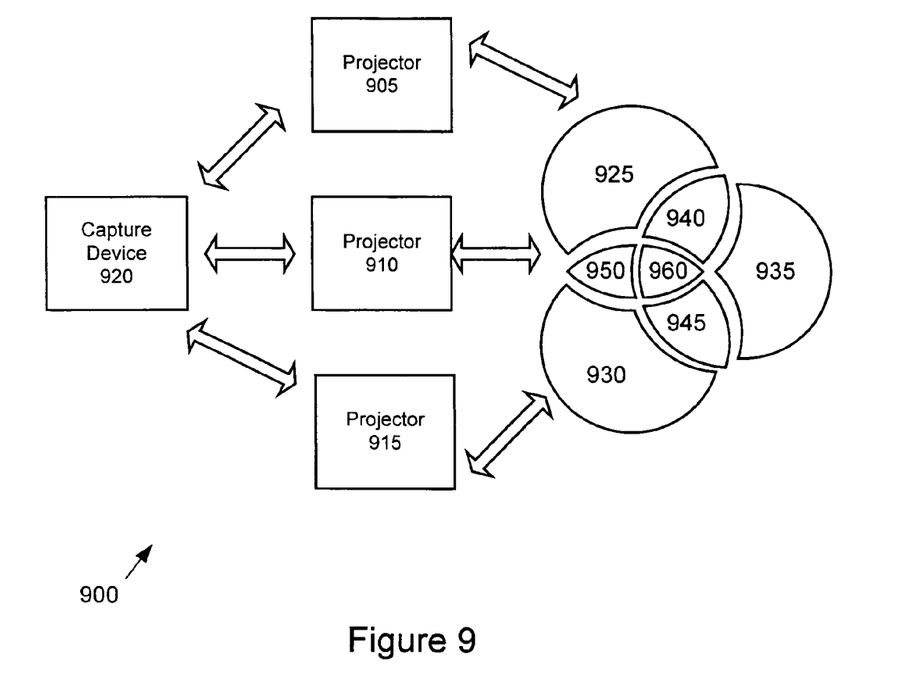
FIG. 9 is a diagram illustrating an environment within which the methods and apparatuses for capturing and viewing content through a multi-lens device are implemented.

FIG. 9 illustrates a system 900 for displaying content. In one embodiment, projector 905, projector 910, and projector 915 receive content from a capture device 920 such as a digital camera, a video camera, and the like. The projectors 905, 910, and 915 are portable and configured to display content by projecting the content onto a surface. In one embodiment, each of the projectors 905, 910, and 915 is associated with unique content. For example, each of the projectors 905, 910, and 915 is associated with a unique lens which transmits a different video feed.

In use, the capture device 920 transmits content to the projectors 905, 910, and 915. In one embodiment, the projectors 905, 910, and 915 are focused in a particular direction and show the associated content with the particular projector. In one embodiment, each of the projectors 905, 910, and 915 is aimed in an exclusive area to display their associated content without interference or overlap of other content. In another embodiment, some of the projectors 905, 910, and 915 are aimed to overlap each other thus creating a combination of multiple pieces of content.

In one embodiment, a projection 925 displays content that originates from the projector 905; a projection 935 displays content that originates from the projector 910; and a projection 930 displays content that originates from the projector 915. The projections 925, 930, and 935 are examples of content that are shown in an exclusive area with no overlap. A projection 940 displays a combination of content originating from the projector 905 and the projector 910. A projection 950 displays a combination of content originating from the projector 905 and the projector 915. A projection 945 displays a combination of content originating from the projector 910 and the projector 915. A projection 960 displays a combination of content originating from the projector 905, the projector 910, and the projector 915. The projections 940, 945, 950, and 960 are examples of content that is shown overlapping with multiple pieces of content thus creating a combination of multiple pieces of content.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
    simultaneously displaying a first content stream and a second content stream within a spherical display;
    receiving instructions to change a partition between a first area for displaying the first content stream and a second area for displaying the second content stream; and
    dynamically partitioning the first area and the second area based on the instructions, wherein the first area and the second area are within the spherical display.

2. The method according to claim 1 further comprising storing the first content stream and the second content stream in a storage device.

3. The method according to claim 1 further comprising capturing the first content stream with a content capturing device.

4. The method according to claim 3 wherein the content capturing device is a video camera.

5. The method according to claim 3 wherein the content capturing device is a digital camera.

6. The method according to claim 1 further comprising simultaneously capturing the first content stream and the second content stream.

7. The method according to claim 1 wherein the instructions are based on rotating a playback ring to adjust the partition.

8. The method according to claim 1 wherein the spherical display includes a flat display surface and a spherical display surface.

9. The method according to claim 1 wherein the first content stream is video footage.

10. The method according to claim 1 wherein the first content stream is a digital image.

11. The method according to claim 1 wherein the first content stream is audio data.

12. A system comprising: means for simultaneously displaying a first content stream and a second content stream within a spherical display; means for receiving instructions to change a partition between a first area for displaying the first content stream and a second area for displaying the second content stream; and means for dynamically partitioning the first area and the second area based on the instructions, wherein the first area and the second area are within the spherical display.

13. A method comprising: receiving a first content stream and a second content stream; projecting the first content stream onto a first area; projecting the second content stream onto a second area; and dynamically intersecting the first content stream onto the second content stream wherein a portion of the first area and the second area are shared.

14. The method according to claim 13 further comprising simultaneously capturing the first content stream and the second content stream.

15. The method according to claim 13 further comprising transmitting the first content stream and the second content stream in real time.

16. The method according to claim 13 wherein the first content stream is video footage.

17. The method according to claim 13 wherein the first content stream is captured by a video camera.

18. A method comprising:
    simultaneously capturing a first content stream and a second content stream;
    simultaneously displaying the first content stream and the second content stream within a spherical display; and
    dynamically partitioning a first area for displaying the first content stream and a second area for displaying the second content stream, wherein the first area and the second area are within the spherical display.

19. A computer-readable medium having computer executable instructions for performing a method comprising:
    receiving a first content stream and a second content stream;
    projecting the first content stream onto a first area;
    projecting the second content stream onto a second area; and
    dynamically intersecting the first content stream onto the second content stream wherein a portion of the first area and the second area are shared.

* * * * *